United States Patent [19]

Repenning et al.

[11] Patent Number: 4,476,201
[45] Date of Patent: Oct. 9, 1984

[54] ELECTROCHEMICAL STORAGE CELL

[75] Inventors: Detlev Repenning, Neckargemünd; Bernd Lindner, Mannheim, both of Fed. Rep. of Germany

[73] Assignee: Brown, Boveri & Cie AG, Mannheim-Käfertal, Fed. Rep. of Germany

[21] Appl. No.: 512,212

[22] Filed: Jul. 8, 1983

[30] Foreign Application Priority Data

Jul. 10, 1982 [DE] Fed. Rep. of Germany ....... 3225861

[51] Int. Cl.³ ............................................. H01M 10/50
[52] U.S. Cl. ...................................... 429/62; 429/104
[58] Field of Search .................................. 429/62, 104

[56] References Cited

U.S. PATENT DOCUMENTS 4,206,272  6/1980  Fischer et al. ...................... 429/104
4,246,325  1/1981  Hatch ................................. 429/104

Primary Examiner—Donald L. Walton
Attorney, Agent, or Firm—Herbert L. Lerner; Laurence A. Greenberg

[57] ABSTRACT

Electrochemical storage cell of the alkali metal and sulfur type with an anode space and a cathode space which are separated from each other by an alkali ion-conducting solid electrolyte and are bounded at least in some regions by a metallic housing. A safety insert is provided for receiving the alkali metal. The alkali metal can emerge via at least one discharge opening into a safety gap. A fusible part is arranged for closing the discharge opening within the safety insert. The part is made of an alloy which contains at least two metals of the groups IB, IIA and/or IIIA of the periodic system. A material for increasing the melting point of the alloy is arranged in the discharge opening.

11 Claims, 1 Drawing Figure

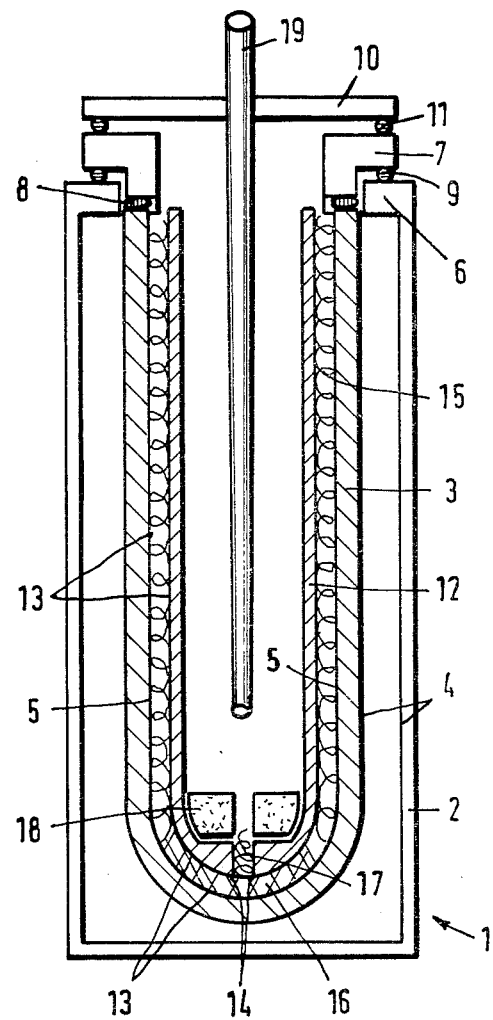

ELECTROCHEMICAL STORAGE CELL

BACKGROUND OF THE INVENTION

1. Field of the Invention

The invention relates to an electrochemical storage cell of the alkali metal and sulfur type with an anode space and a cathode space which are separated from each other by an alkali ion-conducting solid electrolyte and are bounded at least in some regions by a metallic housing, a safety insert in the anode space for receiving the alkali metal from which the alkali metal can emerge via at least one discharge opening into a safety gap.

2. Description of the Prior Art

Such rechargeable electrochemical storage cells are used in high-temperature storage batteries which find application, for instance, as energy sources in electric vehicles.

Rechargeable electrochemical storage cells with solid electrolytes are highly suitable for the construction of storage batteries with high energy and power density. In these solid electrolytes used in alkali/chalcogen storage cells which are made, for example, of beta-aluminum oxide, partial conductivity of the mobile ion is very high and the partial conductivity of the electrons is smaller by many powers of ten. By using such solid electrolytes for the construction of electrochemical storage cells practically no secondary discharge takes place since the electron conductivity is negligible and the reaction substances cannot travel through the solid electrolyte as neutral particles.

A specific example of this are rechargeable electrochemical storage cells of the sodium and sulfur type which have a solid electrolyte of beta-aluminum oxide. An advantage of these electrochemical storage cells is that no electrochemical secondary reactions occur during charging. The reason for this is that only sodium ions can go through the solid electrolyte. The current yield of such a sodium/sulfur storage cell is therefore approximately 100%. In these electrochemical storage cells, the ratio of energy content to the total weight of such a storage cell is very high as compared to lead storage cells, since the reaction substances are light and much energy is liberated in the electrochemical reaction. Electrochemical storage cells of the sodium and sulfur type therefore have considerable advantages over conventional storage batteries such as lead storage batteries.

The solid electrolyte can break if a voltage applied to storage cells is too great. The same can also occur if the solid electrolyte is over age or mechanically damaged. In such a situation, confluence and direct reaction of increased amounts of sodium and sulfur results from the break in the electrolyte. To avoid this, U.S. Pat. No. 4,247,605 provides a safety insert in the anode space which can contain the alkali metal. This safety insert has at its lower end a small discharge opening via which the sodium can enter a safety gap between the safety insert and the solid electrolyte.

A disadvantage of this arrangement is that while no sudden surge of a large amount of sodium can flow into the cathode space in the event of a break of the solid electrolyte, smaller amounts of sodium can flow always and continuously.

SUMMARY OF THE INVENTION

It is therefore an object of the invention to provide an electrochemical storage cell in which the emergence of the sodium from the safety insert is completely prevented in the event of a temperature rise above the working temperature of the storage cell.

With the foregoing and other object in view, there is provided in accordance with the invention an electrochemical storage cell based on alkali metal and chalcogen with an anode space and a cathode space which are separated from each other by an alkali ion-conducting solid electrolyte and are bounded at least in some regions by a metallic housing, a safety insert in the anode space into which safety insert the alkali metal is received, a safety gap between the surface of the safety insert and the surface of the electrolyte, a discharge opening in the safety insert for the discharge of alkali metal from the safety insert into the safety gap, the combination therewith of closing the discharge opening at a predetermined cell temperature comprising a fusible alloy part, melting at the predetermined cell temperature and containing at least two metals selected from the group consisting of metals in Group IB, IIA and IIIA, and a material in the discharge opening which on contact with the alloy in molten condition increases the melting point of the alloy causing the alloy to solidify and close off the discharge opening.

Other features which are considered as characteristic for the invention are set forth in the appended claims.

Although the invention is illustrated and described herein as embodied in electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates an Na/S type electrochemical storage cell with a cathode space formed by the gap between the outer metallic housing and a beta-aluminum oxide solid electrolyte disposed therein. The interior of the solid electrolyte serves as the anode space. A safety insert in the form of a cup and made of aluminum is inserted into the solid electrolyte leaving a narrow safety gap between the electrolyte and the safety insert for receiving liquid sodium from the safety insert flowing through a narrow discharge opening at the bottom. An aluminum wick is placed in the discharge opening. Adjacent to the bottom of the discharge opening is an aluminum screen. A ring-shaped part made of a fusible alloy having a predetermined melting temperature above the operating temperature of the storage cell is arranged in the safety insert without interfering with the flow of sodium during normal operation. When the cell reaches a temperature dangerously above the normal operating temperature, the ring-shaped part melts and flows into the discharge opening where it contacts the aluminum wick which dissolves in the melt forming another alloy of higher melting point, which latter solidifies and thereby closes the discharge opening.

DETAILED DESCRIPTION OF THE INVENTION

In accordance with the invention, a fusible part is arranged for closing the discharge opening within the safety insert, which part is made of an alloy which contains at least two metals of the Group IB, IIA and/or IIIA of the periodic system. Further, a material is arranged in the discharge opening to increase the melting point of the alloy.

As illustrated, the part in the vicinity of the discharge opening of the safety insert starts to melt at a temperature of 451° C. This melting point can be predetermined by making the alloy of which the part is made contain 65% by weight aluminum and 35% magnesium. The weight data refer to the total weight of the alloy. If an alloy used for manufacturing the part contains 30.7% by weight copper and 69.3% by weight magnesium, the part begins to melt at a temperature of 485° C. However, these alloys not only have the property that they begin to melt at the given temperature, they have further advantages vis-a-vis the sodium and the other components of the storage cell. The alloys, particularly the part made thereof, is not soluble in the sodium in the safety container, i.e. safety insert. Aluminum in solid form does not change the melting point of the alloys. The alloys are further chosen so that they do not begin to dissolve the safety insert made of aluminum, so that pit corrosion does not occur at the wall of the safety insert.

According to the invention, a wick of aluminum is arranged within the discharge opening of the safety insert. In the event a temperature rise within the storage cell to a value which is about 451° C. occurs, the part begins to melt and the liquid alloy runs into the discharge opening of the safety insert. It dissolves the aluminum wick located there. The latter causes the melting point of the liquid alloy to increase. Thereby the alloy becomes solidified within the discharge opening. For safety reasons, it is desirable to additionally arrange an aluminum screen in the region of the safety gap immediately adjacent the discharge opening. If the liquid alloy, for unforeseeable reasons, gets into this region, the aluminum screen is contacted thereby. This causes an increase of the melting point so that it solidifies in this region. Thereby the sodium can flow at most to the outer boundary of the safety insert.

The invention, making reference to the drawing, will be explained in greater detail in the following.

An electrochemical storage cell 1 of the sodium and sulfur type is shown in the drawing in a vertical section. The storage cell 1 is bounded by a metallic housing 2 into which is inserted a solid electrolyte 3. The metallic housing 2 has the shape of a cup. It is made of aluminum or an alloy steel. The solid electrolyte 3 arranged in its interior, is made of beta-aluminum oxide. The electrolyte 3 is likewise made in the shape of a cup. The dimensions of the solid electrolyte 3 are chosen so that a coherent space 4 remains between inside surfaces of the metallic housing 2 and the outside surfaces of the solid electrolyte 3. This gap 4 is utilized as the cathode space. The interior of the solid electrolyte 3 serves as the anode space in the embodiment shown here of the storage cell. The metallic housing 2 is provided at its upper open end with an inward pointing flange 6. The solid electrolyte 3 has an outward directed flange 7 at its upper end. This flange is formed by an insulating ring of alpha-aluminum oxide. The insulating ring is connected to the solid electrolyte 3 via a glass solder 8. The insulating ring is designed so that it can take over the function of the outward-pointing flange 7. The flange 7 is put on the flange 6 of the metallic housing 2. A seal 9 is arranged between the two flanges 6 and 7. The cathode space 4 is closed off to the outside by the two flanges 6 and 7. The closure of the storage cell 1 is accomplished by cover plate 10 which is made of a non-conducting material. The cover plate 10 closes the anode space 5 and the entire storage cell 1 to the outside. The cover plate 10 is placed on the flange 7 of the solid electrolyte 3. A gasket 11 is arranged between the flange 7 and the cover plate 10. The anodic current collector is formed by a metallic rod 19, one end of which protrudes far into the safety insert 12. The other end is brought to the outside through a hole in the cover plate 10 and extends a few millimeters beyond the latter. The connection of the parts 6, 7 and 10 of the storage cell 1 is accomplished in known manner and is not explained here in detail.

A safety insert 12 is inserted into the solid electrolyte 3. This insert likewise has the form of a cup and is made of aluminum in the embodiment example described here. An alloy steel can also be used for making the safety insert. The dimensions of the safety insert 12 are chosen so that a narrow safety gap 13 remains between its outside surfaces and the inside surfaces of the solid electrolyte 3. The safety insert 12 which is arranged within the solid electrolyte 3, has at its lower end, a narrow discharge opening 14. The safety insert 12 is provided for receiving the liquid sodium. Thereby, large amounts of sodium are prevented from flowing into the cathode space 4 in the event of a break of the solid electrolyte 3. Within the safety gap 13 which is located between the solid electrolyte 3 and the safety insert 12, metal wool 15 is arranged in the region of the lateral boundary surfaces of the solid electrolyte 3 and the safety insert 12. The metal wool serves the purpose of a capillary structure by means of which the sodium emerging from the discharge opening 14 of the safety insert 12 is transported to the inside surfaces of the solid electrolyte 3. At the same time, the metal wool 15 ensures that these electrolyte surfaces are always wetted with sodium.

In the embodiment example shown here, a metal screen 16 of aluminum is arranged within the safety gap 13, which is directly adjacent to the discharge opening 14 of the safety insert 12. A wick 17 of aluminum is placed into the discharge opening 14 of the safety insert 12. A ring-shaped part 18 is arranged in the interior of the safety insert 12, in the vicinity of the discharge opening 14 such that the discharge opening 14 remains free. The purpose of the part 18 is to close off the discharge opening 14 in the event of a temperature rise of the storage cell 1 to values which are substantially above the operating temperature of the storage cell. According to the invention, this part 18 is made of an alloy which contains at least two metals of the group IB, IIA and IIA of the periodic system. The composition of the alloy depends on the temperature at which the part 18 starts to melt. If it is intended, for instance, that the sodium flow from the safety insert 12 is to be prevented completely if the temperature within the storage cell 1 rises to values which are at about 450° C., an alloy is preferably used which contains 65% by weight aluminum and 35% by weight magnesium. If the part 18 is made of this alloy, the result is that the part 18 begins to melt when an interior temperature of 451° C. is reached. The liquid alloy flows from the interior of the safety insert 12 into the discharge opening 14. The aluminum wick 17 inserted in the discharge opening 14 is dissolved by this liquid alloy. The dissolved aluminum causes an increase of the melting point of the alloy. Thereby, the alloy is solidified within the discharge opening 14. Should the amount of aluminum supplied by the wick 17 not be sufficient to increase the melting point of the alloy, an additional safety factor is provided, namely the aluminum screen 16 which is arranged within the safety gap 13 directly following the discharge opening 14. In the event the alloy does not solidify within the discharge opening 14, solidification is achieved by the aluminum screen 16, which can likewise be dissolved by the liquid alloy. Thus, solidification of the alloy occurs not later than in the region of the safety gap 13 following the the discharge opening 14. The size of the part 18 is designed so that the discharge opening 14 can be closed completely by a plug of the solidifying alloy formed there.

Instead of an alloy with 65% by weight aluminum and 35% by weight magnesium, an alloy of 30.7% by weight copper and 69.3% by weight magnesium can be used for making the part 18. The weight data refer to the total weight of the alloy. A part 18 of this alloy, however, will start to melt only at 485° C. The part can optionally be made of an alloy which contains 50% by weight aluminum and 50% by weight magnesium.

There are claimed:

1. An electrochemical storage cell based on alkali metal and chalcogen with an anode space and a cathode space which are separated from each other by an alkali ion-conducting solid electrolyte and are bounded at least in some regions by a metallic housing, a safety insert in the anode space into which safety insert the alkali metal is received, a safety gap between the surface of the safety insert and the surface of the electrolyte, a discharge opening in the safety insert for the discharge of alkali metal from the safety insert into the safety gap, the combination therewith of closing the discharge opening at a predetermined cell temperature comprising a fusible alloy part melting at said predetermined cell temperature and containing at least two metals selected from the group consisting of metals in Groups IB, IIA and IIIA, and a material in the discharge opening which on contact with said alloy in molten condition increases the melting point of the alloy causing the alloy to solidify and close off the discharge opening.

2. Storage cell according to claim 1, wherein the fusible alloy part is ring-shaped and arranged within the safety insert without obstructing flow of the alkali metal through the discharge opening.

3. Electrochemical storage cell according to claim 1, wherein the fusible alloy part is made of an alloy which contains about 65% by weight aluminum and about 35% by weight of magnesium based on the total weight of the alloy.

4. Storage cell according to claim 1, wherein the fusible alloy part is made of an alloy which contains about 50% by weight aluminum and about 50% by weight magnesium, based on the total weight of the alloy.

5. Electrochemical storage cell according to claim 1, wherein the fusible alloy part is made of an alloy which contains 30.7% by weight copper and 69.3% by weight magnesium, based on the total weight of the alloy.

6. Electrochemical storage cell according to claim 1, wherein said material is a wick of aluminum arranged in the discharge opening of the safety insert.

7. Electrochemical storage cell according to claim 3, wherein said material is a wick of aluminum arranged in the discharge opening of the safety insert.

8. Electrochemical storage cell according to claim 4, wherein said material is a wick of aluminum arranged in the discharge opening of the safety insert.

9. Electrochemical storage cell according to claim 5, wherein said material is a wick of aluminum arranged in the discharge opening of the safety insert.

10. Storage cell according to claim 1, wherein a metal screen of aluminum is arranged in the region of the safety gap which directly adjoins the discharge opening of the safety insert.

11. Storage cell according to claim 6, wherein a metal screen of aluminum is arranged in the region of the safety gap which directly adjoins the discharge opening of the safety insert.

* * * * *